(12) United States Patent
Runde

(10) Patent No.: US 8,459,731 B2
(45) Date of Patent: Jun. 11, 2013

(54) HEAD RESTRAINT AND SEAT STOW FLAT HANDLE

(75) Inventor: David M. Runde, Beverly Hills, MI (US)

(73) Assignee: Magna Seating Inc., Aurora, Ontario (CA)

( * ) Notice: Subject to any disclaimer, the term of this patent is extended or adjusted under 35 U.S.C. 154(b) by 97 days.

(21) Appl. No.: 13/121,569

(22) PCT Filed: Oct. 8, 2009

(86) PCT No.: PCT/CA2009/001443
§ 371 (c)(1),
(2), (4) Date: Jun. 16, 2011

(87) PCT Pub. No.: WO2010/043030
PCT Pub. Date: Apr. 22, 2010

(65) Prior Publication Data
US 2012/0038190 A1    Feb. 16, 2012

Related U.S. Application Data

(60) Provisional application No. 61/105,078, filed on Oct. 14, 2008.

(51) Int. Cl.
*A47C 1/02* (2006.01)
(52) U.S. Cl.
USPC ............... 297/61; 297/378.12; 297/378.14; 297/408

(58) Field of Classification Search
USPC .............. 297/61, 331, 378.1, 278.12, 278.14, 297/183.1, 408, 463.1, 378.12, 378.14; 16/110.1, 412, 430; 292/1, 240, 221–223, 292/217, 225–228, 235–237, 200, 270, 336.3
See application file for complete search history.

(56) References Cited

U.S. PATENT DOCUMENTS

| 2,912,873 | A | | 11/1959 | Little | |
|---|---|---|---|---|---|
| 3,101,821 | A | | 8/1963 | Henry | |
| 3,185,525 | A | * | 5/1965 | Welsh | 297/367 R |
| 4,078,446 | A | | 3/1978 | Baba | |
| 4,541,672 | A | * | 9/1985 | Fukuta et al. | 297/367 R |
| 4,641,545 | A | * | 2/1987 | Rabe | 74/473.19 |
| 5,467,583 | A | | 11/1995 | Beugelsdyk et al. | |
| 6,231,101 | B1 | * | 5/2001 | Kamida et al. | 296/63 |

(Continued)

FOREIGN PATENT DOCUMENTS

| CA | 2610712 A1 | 12/2006 |
|---|---|---|
| DE | 19841599 A1 | 3/2000 |

(Continued)

*Primary Examiner* — David Dunn
*Assistant Examiner* — Alexander Harrison
(74) *Attorney, Agent, or Firm* — Miller Canfield

(57) ABSTRACT

A seat assembly includes a seat back operatively coupled to a seat cushion. The seat back is pivotally movable between a first seating position and a second folded position. A head restraint is operatively coupled to the seat back for pivotal movement between a use position and a stowed position. A handle assembly includes a handling having a first slot operatively coupled to the head restraint and a second slot operatively coupled to the seat back. Operating the handle actuates the head restraint to move from the use position to the stowed position prior to actuating the seat back to move from the first seating position to the second folded position.

13 Claims, 7 Drawing Sheets

U.S. PATENT DOCUMENTS

| | | | |
|---|---|---|---|
| 6,328,381 B1 * | 12/2001 | Smuk | 297/365 |
| 7,252,320 B2 * | 8/2007 | Tsujibayashi et al. | 296/65.09 |
| 7,258,400 B2 | 8/2007 | Yamada | |
| 7,350,870 B2 | 4/2008 | Bates | |
| 2003/0197410 A1 * | 10/2003 | Blair et al. | 297/378.12 |
| 2006/0006720 A1 * | 1/2006 | Yamada | 297/378.12 |
| 2007/0046091 A1 | 3/2007 | Day et al. | |
| 2007/0062324 A1 | 3/2007 | Ingraham | |
| 2010/0207417 A1 * | 8/2010 | Ito et al. | 296/65.05 |

FOREIGN PATENT DOCUMENTS

| | | |
|---|---|---|
| DE | 10216705 A1 | 11/2003 |
| EP | 0359962 A1 | 3/1990 |
| JP | 2008074279 | 4/2008 |
| WO | WO 2008/029791 * | 3/2008 |
| WO | 2009073968 A1 | 6/2009 |

\* cited by examiner

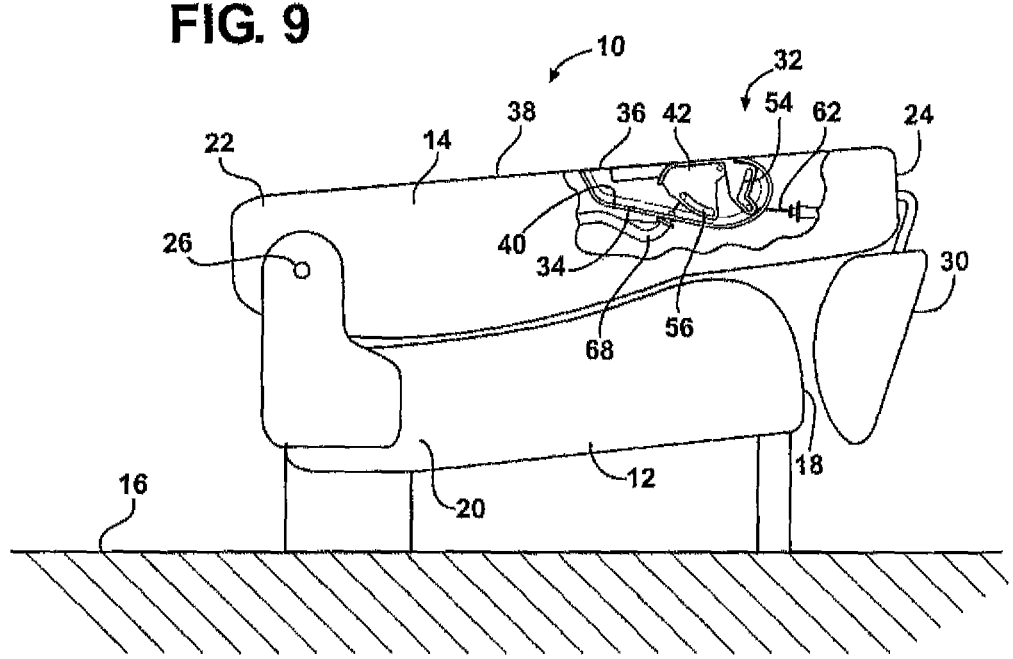

HEAD RESTRAINT AND SEAT STOW FLAT HANDLE

CROSS-REFERENCE TO RELATED APPLICATION

This application claims priority to and all the benefits of U.S. Provisional Application No. 61/105,078, filed on Oct. 14, 2008 and entitled "Head Restraint And Seat Stow Flat Handle."

BACKGROUND OF THE INVENTION

1. Field of the Invention

The invention relates to a seat assembly for an automotive vehicle. More particularly, the invention relates to a seat assembly having a handle assembly for actuating a head restraint and a seat back.

2. Description of Related Art

Automotive vehicles include one or more seat assemblies for supporting seat occupants within a passenger compartment of the vehicle. A typical seat assembly includes a seat back pivotally coupled to a seat cushion. It is well known in the seating art to provide a seat back recliner mechanism or release mechanism operatively coupled between the seat back and seat cushion that allows the seat back to pivot between a generally upright seating position and a forwardly folded position overlying the seat cushion when it is desired to increase the amount of available storage space within the vehicle.

Additionally, the typical seat assembly often includes a head restraint coupled to an upper end of the seat back. The head restraint increases the overall height of the seat back such that when the seat assembly is located in a second or third row within the vehicle, the head restraint has a tendency to interfere with a forward seat assembly when the seat back is pivoted between the upright seating position and the forwardly folded position. Thus, it is necessary to move the head restraint from a use position when the seat back is in the upright seating position to a stowed position prior to pivoting the seat back to the forwardly folded position. A latch mechanism is operatively coupled between the head restraint and the seat back to allow the head restraint to pivot between the use position and the stowed position.

The head restraint also impedes driver rearward visibility when the seat back is in the upright seating position. It is well known in the seating art to allow the head restraint to pivot from the use position to the stowed position to improve driver rearward visibility without pivoting the seat back to the forwardly folded position.

Commonly, the seat assembly will include a first handle assembly for actuating the latch mechanism to move the head restraint from the use position to the stowed position and a second handle assembly for actuating the release mechanism to move the seat back from the upright seating position to the forwardly folded position. Having first and second handle assemblies with separate functions increases the cost and complexity of the seat assembly. As well, positioning two handle assemblies on the seat assembly for easy access can be difficult and may detract from the overall appearance of the seat assembly. Further, because the first and second handle assemblies actuate the latch mechanism and the release mechanism separately, it is important that a user remember to operate the first and second handle assemblies in the correct order otherwise the head restraint will remain in the use position as the seat back pivots from the upright seating position to the forwardly folded position causing interference between the head restraint and the forward seat assembly.

Alternatively, the functions of the first and second handle assemblies, i.e. actuating the latch mechanism and the release mechanism, may be combined into a single handle assembly. When the functions of the first and second handle assemblies are combined into a typical single handle assembly, the efforts of both functions become additive, thus increasing the effort felt by an end user.

It is therefore desirable to provide a single handle assembly for actuating both a head restraint latch mechanism and a seat back release mechanism. It is also desirable that the single handle assembly actuate the head restraint latch mechanism to move the head restraint from a use position to a stowed position prior to actuating the seat back release mechanism to pivot a seat back from an upright seating position to a forwardly folded position. It is further desirable that the single handle assembly allow actuate the head restraint latch mechanism to move the head restraint from the use position to the stowed position without actuating the seat back release mechanism. It is still further desirable that the single handle assembly actuate both the head restraint latch mechanism and the seat back release mechanism without combining the individual efforts of each.

SUMMARY OF THE INVENTION

According to one aspect of the invention, a seat assembly includes a seat back operatively coupled to a seat cushion. The seat back is selectively pivotally movable between a first seating position and a second folded position. A head restraint is operatively coupled to the seat back. The head restraint is selectively pivotally movable between a use position and a stowed position. A handle assembly includes a handle having a first slot operatively coupled to the head restraint and a second slot operatively coupled to the seat back. Operating the handle actuates the head restraint to move from the use position to the stowed position prior to actuating the seat back to move from the first seating position to the second folded position.

According to another aspect of the invention, a seat assembly includes a seat back movable between a first seating position and a second folded position and a head restraint operatively coupled to the seat back. The head restraint is movable between a use position and a stowed position. The seat assembly also includes a handle assembly having a handle pivotally coupled to the seat back. A first cable is operatively coupled between the handle and the head restraint. Pivoting the handle actuates the first cable to move the head restraint from the use position to the stowed position. A second cable is operatively coupled between the handle and the seat back. Pivoting the handle actuates the second cable to move the seat back from the first seating position to the second folded position. Pivoting the handle actuates the first cable independently of the second cable.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 9 is a side view of the seat assembly with the seat back in a forwardly folded position, the head restraint in the stowed position, and the handle in the design position.

DETAILED DESCRIPTION OF THE EMBODIMENTS

Figure 1:
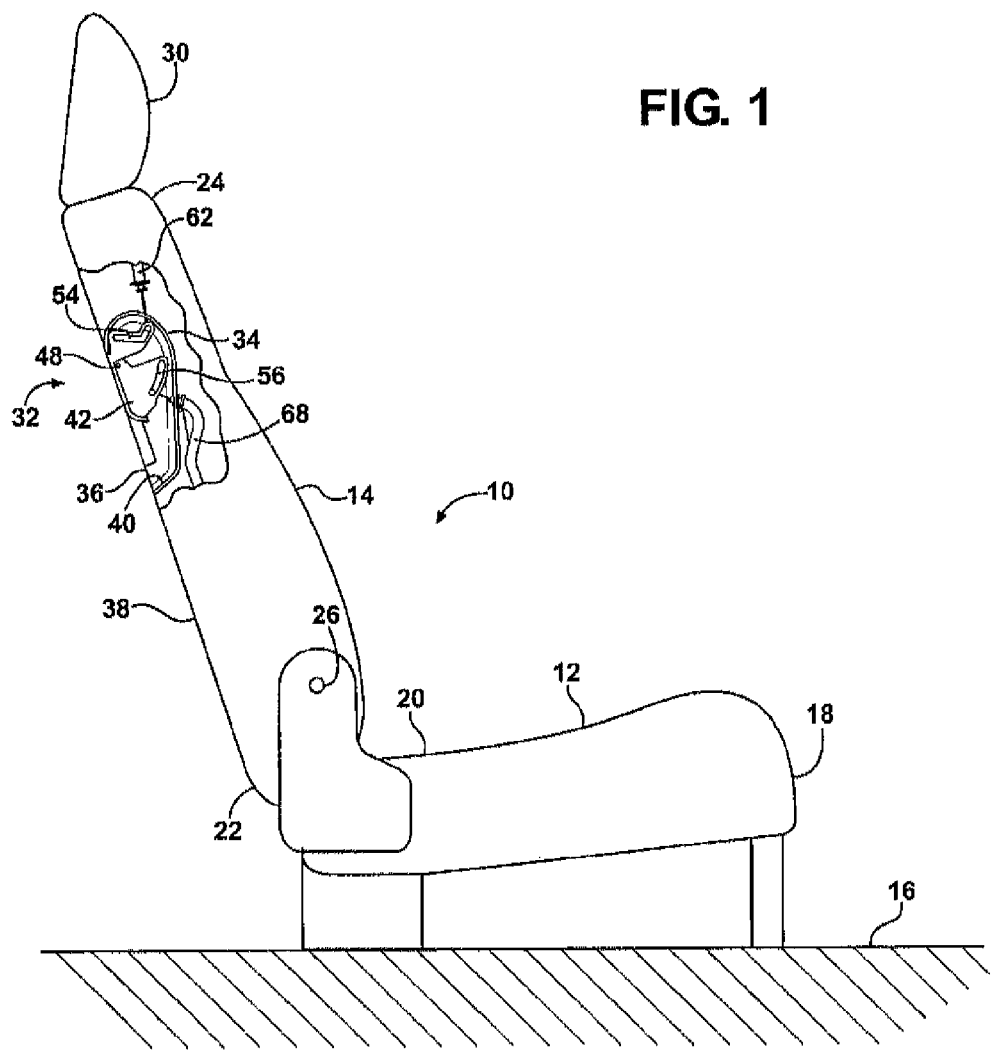
FIG. 1 is a side view of a seat assembly including a seat back in an upright seating position, a head restraint in a use position, and a handle assembly according to one embodiment of the invention.

Referring to the Figures, a seat assembly for an automotive vehicle is generally shown at 10. The seat assembly 10 includes a seat cushion 12 and a seat back 14 for supporting a seat occupant above a floor 16 in the vehicle. The seat cushion 12 extends between a forward end 18 and a rearward end 20. The seat back 14 extends between a lower end 22 and an upper end 24. The lower end 22 of the seat back 14 is operatively coupled to the rearward end 20 of the seat cushion 12 by a pair of disc recliners 26, as is well known in the vehicle seating art. The disc recliners 26 allow for selective pivotal movement of the seat back 14 between a generally upright seating position, shown in FIG. 1, and a forwardly folded position overlying the seat cushion 12, shown in FIG. 9. It is contemplated that any suitable means for coupling the seat back 14 and the seat cushion 12 that allows for selective pivotal movement of the seat back 14 between the upright seating position and the forwardly folded position can be used without varying from the scope of the invention. The seat back 14 is biased towards the forwardly folded position.

The seat assembly 10 also includes a head restraint 30 that is operatively coupled to the upper end 24 of the seat back 14 by a head restraint latch mechanism (not shown). The latch mechanism allows for selective pivotal movement of the head restraint 30 between a use position, shown in FIG. 1, and a stowed position, shown in FIGS. 4, 7, and 9. In the use position the head restraint 30 is generally aligned with the seat back 14. In the stowed position the head restraint 30 extends generally perpendicularly to the seat back 14. The head restraint 30 is biased towards the stowed position.

A handle assembly, generally shown at 32, is provided for actuating the disc recliners 26 and the latch mechanism. More specifically, the handle assembly 32 actuates the latch mechanism from a latched position to an unlatched position. In the latched position the latch mechanism maintains the head restraint 30 in the use position. In the unlatched position the latch mechanism allows the head restraint 30 to pivot from the use position to the stowed position. Additionally, the handle assembly 32 actuates the disc recliners 26 from a locked state to an unlocked state. In the locked state the disc recliners 26 maintain the seat back 14 in the upright seating position. In the unlocked state the disc recliners 26 allow the seat back 14 to pivot from the upright seating position to the forwardly folded position.

Referring to FIGS. 2, 3, 5, 6 and 8, the handle assembly 32 includes a housing 34 positioned within the seat back 14 such that an opening 36 of the housing 34 is flush with a back side 38 of the seat back 14. The housing 34 defines a recess 40 within the seat back 14. The handle assembly 32 also includes a handle 42 extending between a first end 44 and a second end 46. The first end 44 of the handle 42 is pivotally coupled to the housing 34 at pivot point 48. The handle 42 pivots about the pivot point 48 between a design or rest position, shown in FIG. 2, and a lifted or fully actuated position, shown in FIG. 8. In the design position, the handle 42 is generally contained within the recess 40. In the fully actuated position, the handle 42 is pivoted outwardly from the housing 34 such that the second end 46 protrudes from the recess 40.

The handle 42 includes a first portion 50 disposed at the first end 44 thereof and a second portion 52 disposed generally between the first 44 and second 46 ends thereof. The first portion 50 includes a first generally L-shaped slot 54 and the second portion 52 includes a second arcuate slot 56. The L-shaped slot 54 includes a first leg 58 and a second leg 60. In the embodiment shown, the first leg 58 is shorter than the second leg 60, however, it is appreciated that the exact shape and size of the L-shaped slot 54 may differ without varying from the scope of the invention. A first Bowden-type cable 62 is operatively coupled between the L-shaped slot 54 and the latch mechanism. More specifically, a first end 64 of the first cable 62 is slidably coupled to the L-shaped slot 54 and a second end (not shown) of the first cable 62 is operatively coupled to the latch mechanism. Pulling the first cable 62 will actuate the latch mechanism from the latched position to the unlatched position, allowing the head restraint 30 to pivot from the use position to the stowed position. A second Bowden-type cable 68 is operatively coupled between the arcuate slot 56 and the disc recliners 26. More specifically, a first end 70 of the second cable 68 is slidably coupled to the arcuate slot 56 and a second end (not shown) of the second cable 68 is operatively coupled to the disc recliners 26. Pulling the second cable 68 will actuate the disc recliners 26 from the locked state to the unlocked state allowing the seat back 14 to pivot from the upright seating position to the forwardly folded position. The L-shaped slot 54 and the arcuate slot 56 are designed to control actuation of the latch mechanism and the disc recliners 26 such that the head restraint 30 is disposed in the stowed position prior to the seat back 14 pivoting to the forwardly folded position. It is appreciated, however, that the L-shaped slot 54 and the arcuate slot 56 may be designed to control actuation of the latch mechanism and the disc recliners 26 such that the seat back 14 is disposed in the forwardly folded position prior to the head restraint 30 pivoting to the stowed position without varying from the scope of the invention.

Figure 2:
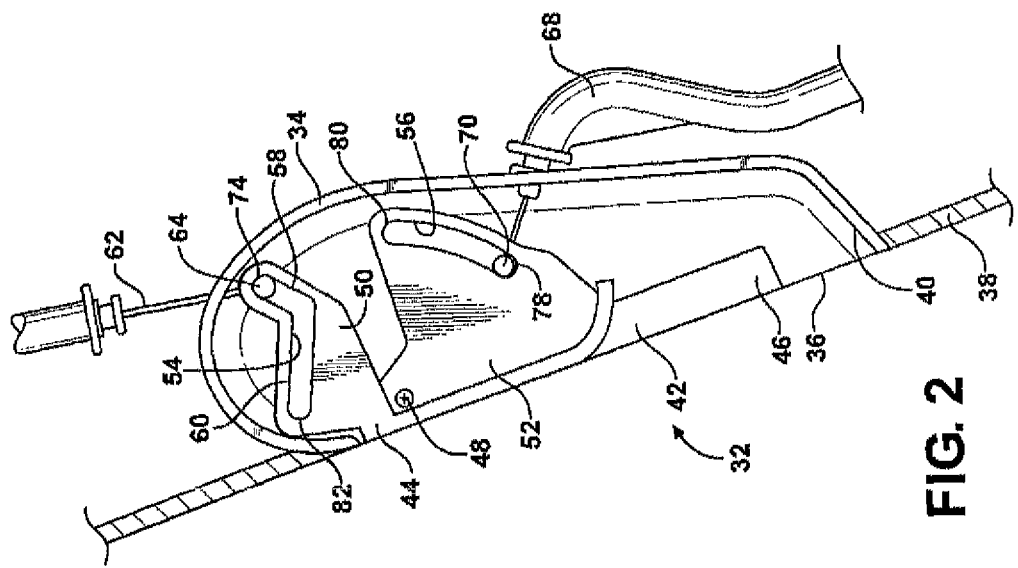
FIG. 2 is a side view of the handle assembly illustrating a handle in a design position.

Both the first and second cables 62, 68 are pulled by pivoting the handle 42. When the handle 42 is in the design position, the first end 64 of the first cable 62 is located at a closed end 74 of the first leg 58 of the L-shaped slot 54 and the first end 70 of the second cable 68 is located at a proximal end 78 of the arcuate slot 56, as shown in FIG. 2. At this stage the head restraint 30 is in the use position and the seat back 14 is in the upright seating position, as shown in FIG. 1.

Figure 3:
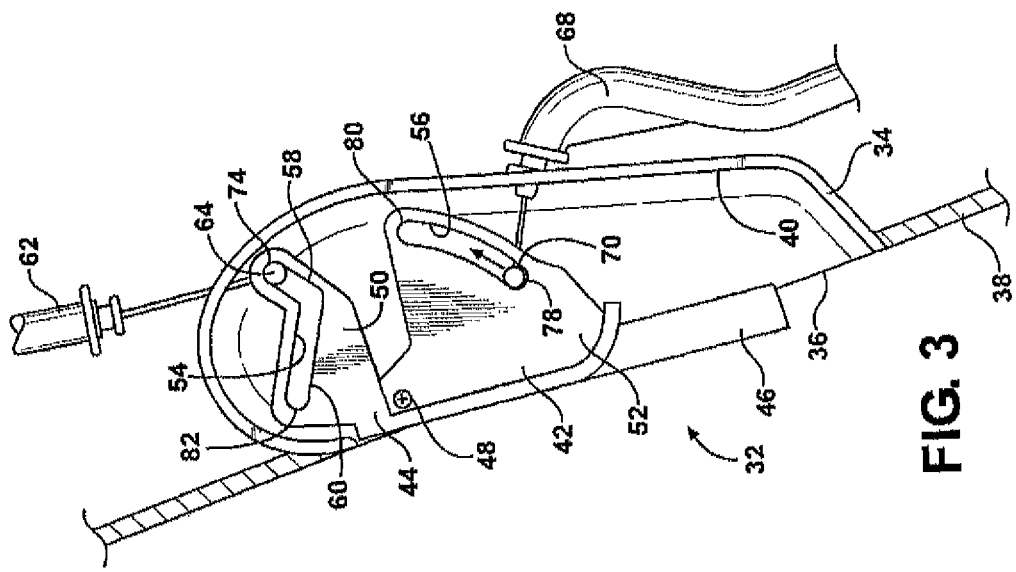
FIG. 3 is a side view of the handle assembly illustrating the handle in a first partially actuated position.

Referring to FIG. 3, as the handle 42 begins to pivot about the pivot point 48 from the design position to a first partially actuated position the closed end 74 of the first leg 58 applies tension to the first cable 62 and the first end 70 of the second cable 68 begins to travel along the arcuate slot 56 towards a distal end 80 thereof. In the embodiment shown, the handle 42 pivots through approximately ten (10) degrees of travel from the design position to the first partially actuated position. It is appreciated, however, that the pivotal travel of the handle 42 may be different without varying the scope of the invention. At this stage the head restraint 30 is still in the use position and the seat back 14 is still in the upright seating position.

Figure 4:
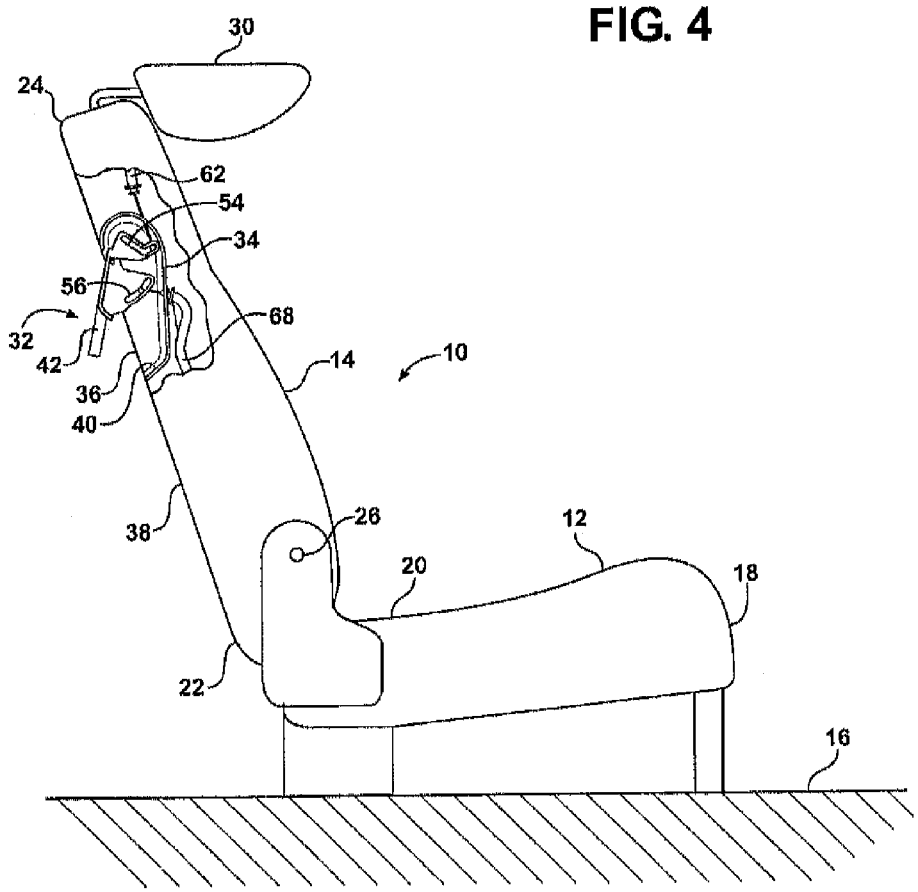
FIG. 4 is a side view of the seat assembly with the seat back in the upright seating position, the head restraint in a stowed position, and the handle in a second partially actuated position.
Figure 5:
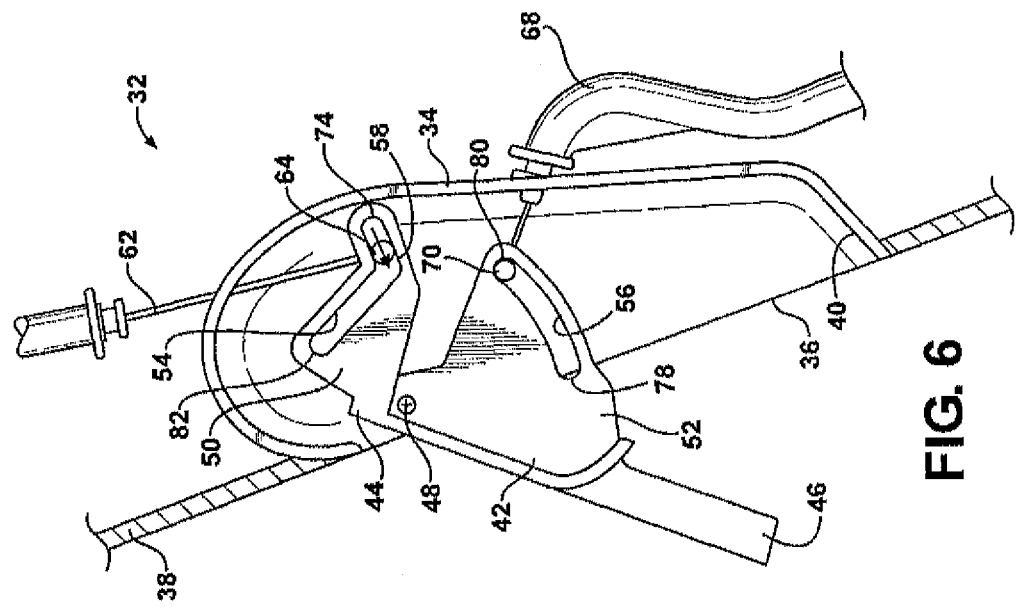
FIG. 5 is a side view of the handle assembly illustrating the handle in the second partially actuated position.

Referring to FIG. 5, as the handle 42 continues to pivot from the first partially actuated position to a second partially actuated position the closed end 74 of the first leg 58 pulls the first cable 62 to actuate the latch mechanism from the latched position to the unlatched position to allow the head restraint 30 to pivot to the stowed position. At the same time, the first end 70 of the second cable 68 continues to travel along the arcuate slot 56 towards the distal end 80 thereof. In the embodiment shown, the second partially actuated position of the handle 42 is approximately twenty-five (25) to thirty-five (35) degrees of travel from the design position. It is appreciated, however, that the pivotal travel of the handle 42 may be different without varying the scope of the invention. At this stage the head restraint 30 is in the stowed position and the seat back 14 is still in the upright seating position, as shown in FIG. 4. It is noted that as the handle 42 is pivoted from the design position to the second partially actuated position only the effort to actuate the latch mechanism from the latched position to the unlatched position is felt by a user because only the first cable 62 is pulled. As the first cable 62 is pulled, the first end 70 of the second cable 68 travels freely along the arcuate slot 56.

Figure 6:
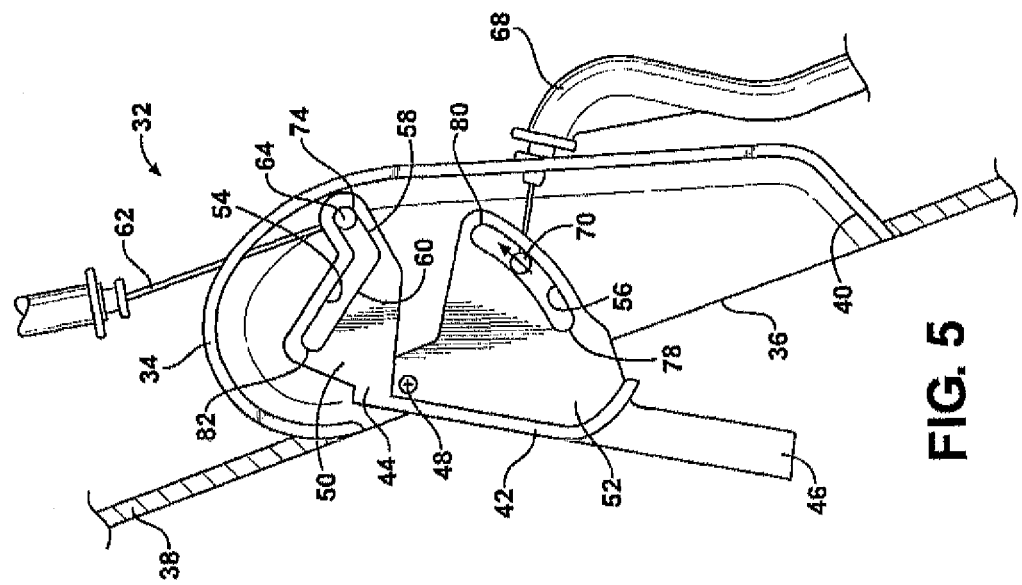
FIG. 6 is a side view of the handle assembly illustrating the handle in a third partially actuated position.

With the head restraint 30 in the stowed position the handle 42 may be released prior to actuation of the disc recliners 26. Therefore, the seat back 14 will remain in the upright seating position. It is appreciated that with the seat back 14 in the upright seating position and the head restraint 30 in the stowed position, driver rearward visibility is improved without having to pivot the seat back 14 to the forwardly folded position. Alternatively, further pivoting of the handle 42 from the second partially actuated position to a third partially actuated position causes the first end 64 of the first cable 62 to begin to travel away from the closed end 74 of the first leg 58 toward the second leg 60 while the distal end 80 of the arcuate slot 56 engages the first end 70 of the second cable 68 to apply tension to the second cable 68, as shown in FIG. 6. In the embodiment shown, the third partially actuated position of the handle 42 is approximately forty-five (45) degrees of travel from the design position. It is appreciated, however, that the pivotal travel of the handle 42 may be different without varying the scope of the invention. At this stage the head restraint 30 is in the stowed position and the seat back 14 is still in the upright seating position.

Figure 7:
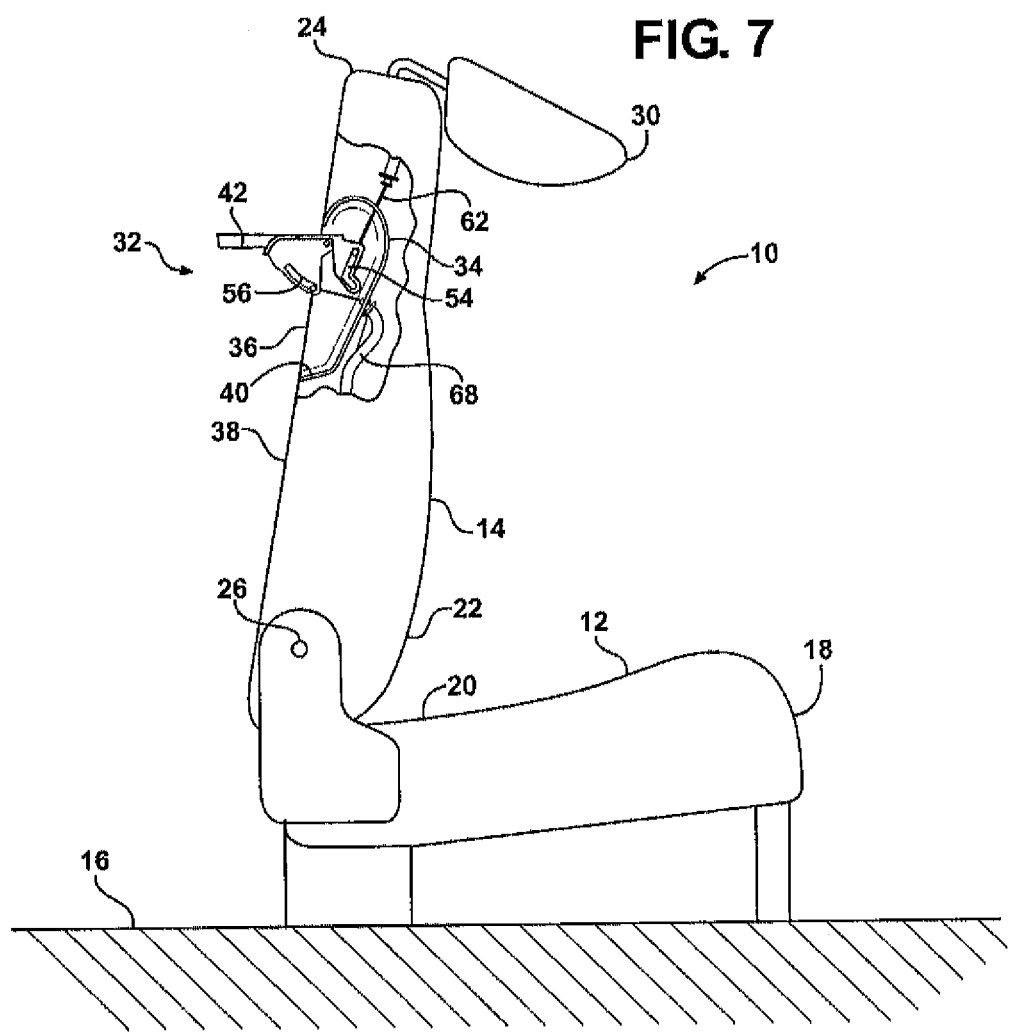
FIG. 7 is a side view of the seat assembly with the seat back pivoting forwardly, the head restraint in the stowed position, and the handle in a fully actuated position.
Figure 8:
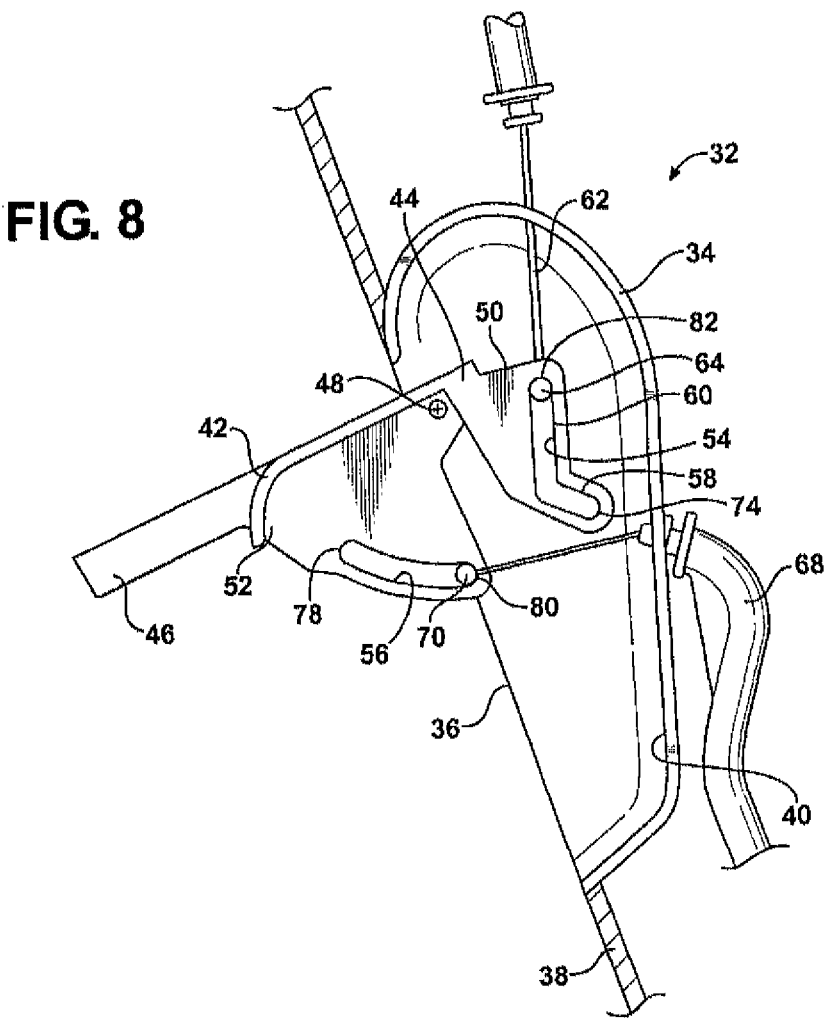
FIG. 8 is a side view of the handle assembly illustrating the handle in the fully actuated position.

Referring to FIGS. 7 and 8, continued further pivoting of the handle 42 from the third partially actuated position to a fully actuated position causes the first end 64 of the first cable 62 to travel along the second leg 60 away from the first leg 58 toward a closed end 82 of the second leg 60. At the same time, the distal end 80 of the arcuate slot 56 pulls the first end 70 of the second cable 68 to actuate the disc recliners 26 from the locked state to the unlocked state to allow the seat back 14 to pivot toward the forwardly folded position. At this stage, when the seat back 14 is in the forwardly folded position and the head restraint 30 is in the stowed position, the head restraint 30 is adjacent the forward end 18 of the seat cushion 12, as shown in FIG. 9. It is noted that as the handle 42 is pivoted from the second partially actuated position to the fully actuated position only the effort to actuate the disc recliners 26 from the locked state to the unlocked state is felt by the user because only the second cable 68 is pulled. As the second cable 68 is pulled, the first end 64 of the first cable 62 travels freely along the first 58 and second 60 legs of the L-shaped slot 54. Thus, it is clear that the efforts to actuate the latch mechanism and the disc recliners 26 are not additive.

The invention has been described herein in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly for supporting an occupant in an automotive vehicle, said seat assembly comprising:
a seat cushion;
a seat back operatively coupled to said seat cushion, said seat back selectively pivotally movable between a first seating position and a second folded position;
a head restraint operatively coupled to said seat back, said head restraint selectively pivotally movable between a use position and a stowed position; and
a handle assembly including a handle having a first slot operatively coupled to said head restraint and a second slot operatively coupled to said seat back;
a first cable operatively coupled between said first slot and said head restraint; and
a second cable operatively coupled between said second slot and said seat back,
wherein operating said handle actuates said head restraint to move from said use position to said stowed position prior to actuating said seat back to move from said first seating position to said second folded position.

2. A seat assembly as set forth in claim 1 wherein a first effort to actuate said head restraint is isolated from a second effort to actuate said seat back.

3. A seat assembly as set forth in claim 2 wherein said first slot includes a first leg extending between a first closed end and a second leg, said second leg extending between a second closed end and said first leg.

4. A seat assembly as set forth in claim 3 wherein said second slot is arcuate and extends between a proximal end and a distal end.

5. A seat assembly as set forth in claim 4 wherein a first end of said first cable is slidably coupled to said first slot and is disposed at said first closed end of said first leg and a first end of said second cable is slidably coupled to said second slot and is disposed at said proximal end when said handle is in a design position.

6. A seat assembly as set forth in claim 5 wherein actuating said handle from said design position to a first partially actuated position causes said first closed end of said first leg to apply tension to said first cable and said first end of said second cable slides freely along said second slot.

7. A seat assembly as set forth in claim 6 wherein actuating said handle from said first partially actuated position to a second partially actuated position causes said first closed end of said first leg to pull said first cable to actuate said head restraint from said use position to said stowed position and said first end of said second cable slides freely along said second slot.

8. A seat assembly as set forth in claim 7 wherein actuating said handle from said second partially actuated position to a third partially actuated position causes said distal end of said second slot to apply tension to said second cable and said first end of said first cable slides freely along said first leg away from said first closed end thereof.

9. A seat assembly as set forth in claim 8 wherein actuating said handle from said third partially actuated position to a fully actuated position causes said distal end of said second slot to pull said second cable to actuate said seat back from said first seating position to said second folded position and said first end of said first cable slides freely along said second leg toward said second closed end thereof.

10. A seat assembly as set forth in claim 9 wherein said first end of said first cable is disposed at said second closed end of said second leg of said first slot and said first end of said second cable is disposed at said distal end of said second slot when said handle is in said fully actuated position.

11. A seat assembly for supporting an occupant in an automotive vehicle, said seat assembly comprising:
   a seat back movable between a first seating position and a second folded position;
   a head restraint operatively coupled to said seat back, said head restraint movable between a use position and a stowed position;
   a handle assembly including a handle pivotally coupled to said seat back;
   a first cable operatively coupled between said handle and said head restraint, wherein pivoting said handle actuates said first cable to move said head restraint from said use position to said stowed position; and
   a second cable operatively coupled between said handle and said seat back, wherein pivoting said handle actuates said second cable to move said seat back from said first seating position to said second folded position;
   wherein pivoting said handle actuates said first cable independently of said second cable and wherein said handle includes a first slot and a second slot, said first cable operatively coupled between said first slot and said head restraint, and said second cable operatively coupled between said second slot and said seat back.

12. A seat assembly as set forth in claim 11 wherein a first pivotal movement of said handle in a first direction causes said first slot to pull said first cable thereby moving said head restraint from said use position to said stowed position, said first pivotal movement pulling said first cable independently of said second cable.

13. A seat assembly as set forth in claim 12 wherein a second pivotal movement of said handle in said first direction causes said second slot to pull said second cable thereby moving said seat back from said first seating position to said second folded position, said second pivotal movement pulling said second cable independently of said first cable.

* * * * *